United States Patent
Shige et al.

(10) Patent No.: US 9,109,449 B2
(45) Date of Patent: Aug. 18, 2015

(54) TURBINE ROTOR AND MANUFACTURING METHOD OF TURBINE ROTOR

(75) Inventors: Takashi Shige, Hyogo (JP); Shin Nishimoto, Tokyo (JP); Kimmitsu Maruyama, Tokyo (JP); Kenji Kawasaki, Hyogo (JP); Yoshiaki Fukunaga, Hyogo (JP); Takashi Nakano, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 1117 days.

(21) Appl. No.: 12/673,387

(22) PCT Filed: Jul. 15, 2009

(86) PCT No.: PCT/JP2009/063137
§ 371 (c)(1),
(2), (4) Date: Feb. 12, 2010

(87) PCT Pub. No.: WO2010/041506
PCT Pub. Date: Apr. 15, 2010

(65) Prior Publication Data
US 2011/0206525 A1    Aug. 25, 2011

(30) Foreign Application Priority Data
Oct. 8, 2008    (JP) .................... 2008-261660

(51) Int. Cl.
*B21K 25/00*    (2006.01)
*F01D 5/06*    (2006.01)
(Continued)

(52) U.S. Cl.
CPC ............ *F01D 5/063* (2013.01); *B23K 35/30* (2013.01); *C21D 6/002* (2013.01); *C21D 9/28* (2013.01);
(Continued)

(58) Field of Classification Search
CPC .............. B23K 2201/001; B23K 2203/04; C21D 6/002; C21D 9/28
USPC ..................... 219/146.23; 148/320
See application file for complete search history.

(56) References Cited

U.S. PATENT DOCUMENTS 4,561,888 A    12/1985 Okuda et al.
4,897,519 A *   1/1990 Clark et al. ............... 219/76.14
(Continued)

FOREIGN PATENT DOCUMENTS

| JP | 11-267881 | 10/1999 | |
|----|-----------|---------|---|
| JP | 2001-123801 | 5/2001 | |
| JP | 2003-049223 | 2/2003 | |
| JP | 2003049223 A * | 2/2003 | ............... B23K 9/23 |
| JP | 2008-093668 | 4/2008 | |

OTHER PUBLICATIONS

Keys to Metals, Nitrogen in Steels: Part One, Jun. 2007, Keys to Metals AG, pp. 1-5.*

(Continued)

*Primary Examiner* — Jie Yang
(74) *Attorney, Agent, or Firm* — Wenderoth, Lind & Ponack, L.L.P.

(57) ABSTRACT

A turbine rotor has suitable strength and toughness without causing soaring manufacturing costs and prolonged manufacturing time. The turbine rotor is constructed by welding a rotor member for high temperature made of high Cr steel to a rotor member for low temperature made of low Cr steel. The high temperature rotor member is formed from high Cr steel of which the nitrogen content is 0.02% or higher by mass %. A filler material welds the high temperature rotor member and the low temperature rotor member together, and is a 9% Cr-based filler material of which the nitrogen content is 0.025% or lower by mass %.

12 Claims, 6 Drawing Sheets

(51) Int. Cl.
  *B23K 35/30* (2006.01)
  *C21D 6/00* (2006.01)
  *C21D 9/28* (2006.01)
  *C21D 9/32* (2006.01)
  *C21D 9/50* (2006.01)
  *C22C 38/02* (2006.01)
  *C22C 38/04* (2006.01)
  *C22C 38/42* (2006.01)
  *C22C 38/44* (2006.01)
  *C22C 38/46* (2006.01)
  *C22C 38/48* (2006.01)

(52) U.S. Cl.
  CPC .. *C21D 9/32* (2013.01); *C21D 9/50* (2013.01); *C22C 38/02* (2013.01); *C22C 38/04* (2013.01); *C22C 38/42* (2013.01); *C22C 38/44* (2013.01); *C22C 38/46* (2013.01); *C22C 38/48* (2013.01); *B23K 2201/001* (2013.01); *B23K 2203/04* (2013.01); *Y10T 29/4932* (2015.01)

(56) References Cited

U.S. PATENT DOCUMENTS

| | | | | |
|---|---|---|---|---|
| 4,917,738 | A * | 4/1990 | Takano et al. | 148/325 |
| 6,174,132 | B1 * | 1/2001 | Shiga et al. | 415/199.5 |
| 7,946,813 | B2 * | 5/2011 | Fukuda et al. | 415/216.1 |
| 2001/0027966 | A1 * | 10/2001 | Iwatsubo et al. | 219/137 WM |

OTHER PUBLICATIONS

Totten, George E., ed., Steel Heat Treatment: Metallurgy and Technologies, 2007, pp. 1-5.*
International Preliminary Report on Patentability and Written Opinion of the International Searching Authority issued Apr. 21, 2011 in International (PCT) Application No. PCT/JP2009/063137 with English translation.
Extended European Search Report issued Jan. 19, 2015 in corresponding European Application No. 09806067.6.

* cited by examiner

TURBINE ROTOR AND MANUFACTURING METHOD OF TURBINE ROTOR

TECHNICAL FIELD

The present invention relates to a turbine rotor, and a manufacturing method of the turbine rotor, and specifically, to a turbine rotor suitable for use in a steam turbine, and a manufacturing method of the turbine rotor.

BACKGROUND ART

When a rotor for a steam turbine is manufactured, the rotor material is selected from the viewpoint of high-temperature strength to temperature distribution within the steam turbines. Specifically, as the rotor material, 10% Cr steel which is strengthened by the inclusion of 0.02% or higher of nitrogen, 10% Cr steel (high Cr steel) containing W (tungsten), or the like is used in a high temperature region exceeding 566° C., 1 to 2.25% CrMoV low alloy steel is used in an intermediate region of 566 to 380° C., and 3.5% NiCrMoV low alloy steel is used in a low temperature region of under 380° C. Additionally, in an environment where the high temperature region, and the intermediate and low temperature regions exist together, an integral turbine rotor made of high Cr steel which has a strength corresponding to the high temperature region is used.

However, since the high Cr steel is a high-cost material, it is a great burden in terms of cost to form the whole turbine rotor, used in an environment where the high temperature region and the intermediate and low temperature regions exist together, from the high Cr steel.

Thus, a dissimilar steel welded rotor is suggested which is used for a steam turbine in which the high temperature region and the intermediate and low temperature regions exist together within the steam turbine, and in which a turbine rotor part which is arranged in a position where the environmental temperature within the steam turbine is the intermediate or low temperature regions is formed from an inexpensive low alloy steel, and a turbine rotor part which is arranged in a position where the environmental temperature within the steam turbine is the high temperature region is formed from high Cr steel having excellent high-temperature strength.

As the dissimilar steel welded rotor, for example, a turbine rotor in which a high Cr steel rotor and a low Cr steel rotor are welded together using a filler material in which the content of Cr steel is 1.0 to 3.5% by mass % is disclosed in Patent Document 1.

However, in the conventional turbine rotor as disclosed in Patent Document 1, in which a high Cr steel rotor member and a low Cr steel rotor member are welded together, generally, 0.02% or higher of nitrogen is contained in high Cr steel by mass % in order to increase its high-temperature strength. However, when a 10% Cr steel or a 10% Cr steel containing W, and low Cr steel are welded together, there is a problem that minute blowholes are apt to be generated in the filler material by the nitrogen contained in the high Cr steel.

Especially when a filler material of low Cr steel is used, since the content of Cr in the filler material is small, it is confirmed that the solubility of the nitrogen in the filler material is low, and minute blowholes are apt to be generated. Since the turbine rotor is a high-speed rotating body, a rotor defect that undergoes repeated fatigue is not permitted, and even minute blowholes become a problem if the blowholes are concentrated, so a secure welded joint with no blowholes is required.

Additionally, when a rotor member for high temperature made of 12% Cr steel (and broadly, 10% Cr steel) and a rotor member for low temperature made of low alloy steel are welded together to manufacture a dissimilar steel rotor, Patent Document 2 discloses a technique of manufacturing a dissimilar steel rotor through a step of performing build-up welding by a suitable material on the high temperature rotor member to form an intermediate member, performing high-temperature heat treatment on the high temperature rotor member having the intermediate member, a step of welding the low temperature rotor member to the intermediate member, and a step of performing low-temperature heat treatment on both the high temperature rotor member and the low temperature rotor member.

However, since build-up welding and two heat treatments are required in the technique disclosed in Patent Document 2, soaring manufacturing costs and prolonged manufacturing time become problems.

Additionally, Patent Document 3 discloses a technique of manufacturing a dissimilar steel rotor by forming the high temperature rotor member from 9% Cr steel (and broadly, 10% Cr steel), and forming the low temperature rotor member from 1% Cr steel, welding together the high temperature rotor member and the low temperature rotor member by using a 9% Cr-based filler material, and performing heat treatment on the welded member at 625 to 655° C. However, minute blowholes may be generated even in the technique disclosed in Patent Document 3.

That is, in the technique disclosed in Patent Document 1, in a case where the high Cr steel rotor member, which contains 0.02% or higher of nitrogen by mass % in order to increase high-temperature strength, and the low Cr steel rotor member are directly welded together, there is a problem in that minute blowholes may be generated in the filler material due to the nitrogen contained in the high Cr steel. In addition, if not low Cr but high Cr steel, such as 9Cr steel, is used as the filler material used for the welding, blowholes are hardly generated. However, since generation of the blowholes is not completely eliminated, the problem cannot be solved.

Additionally, since build-up welding and two heat treatments are required in the technique disclosed in Patent Document 2, there are problems in terms of manufacturing costs and manufacturing time.

Additionally, in the technique disclosed in Patent Document 3, even in the case of a high intermediate pressure turbine in which a dissimilar steel rotor using 9% Cr steel and 1% Cr steel is used in the high and intermediate temperature regions, a problem that minute blowholes may be generated occurs.

RELATED ART DOCUMENT

Patent Document

[Patent Document 1] Japanese Patent Application Laid-Open No. 2008-93668
[Patent Document 2] Japanese Patent Application Laid-Open No. 2001-123801
[Patent Document 3] Japanese Patent Application Laid-Open No. 2003-49223

SUMMARY OF THE INVENTION

Accordingly, the invention was made in view of the problems of this conventional technique, and the object thereof is to provide a turbine rotor with no blowholes, and a manufacturing method of the turbine rotor, without causing soaring manufacturing costs or prolonged manufacturing time, since it is optimal if the number of welding times and heat treatments is one.

The present inventor has confirmed that it is possible to prevent generation of minute blowholes when 9% Cr steel in which the nitrogen content is set to 0.025% or lower is used as a filler material, and has invented a turbine rotor, and a manufacturing method of the turbine rotor capable of solving the problems.

In order to solve the above problems, the invention provides a turbine rotor constructed by welding a high temperature rotor member made of high Cr steel, and a low temperature rotor member made of low Cr steel. The high temperature rotor member is formed from high Cr steel in which the nitrogen content is 0.02% or higher by mass %, and a filler material which welds the high temperature rotor member and the low temperature rotor member together is a 9% Cr-based filler material in which the nitrogen content is 0.025% or lower by mass %.

Even if the high temperature rotor member made of high Cr steel in which nitrogen is 0.02% or higher and the low temperature rotor member made of low Cr steel are welded together by using 9% Cr-based filler material in which the nitrogen content is 0.025% or lower by mass % as the filler material, generation of minute blowholes can be prevented.

Moreover, since there is no need for build-up welding, a single instance of welding and heat treatment is sufficient, and the problems of soaring manufacturing costs and prolonged manufacturing time do not occur.

Additionally, the low temperature rotor member may be formed from 2.25CrMoV steel, and the high temperature rotor member and the low temperature rotor member which are welded together may be subjected to heat treatment for 40 to 60 hours at 625 to 650° C. so that the Vickers hardness of the high temperature rotor member is set to HV 350 or less.

The creep rupture position of a welded joint between dissimilar kinds of steels is a heat-affected zone with a fine grain structure generated on the side of the low alloy steel, and the creep strength is governed by the kind of low alloy steel and the state of the fine grain structure. Therefore, it is possible to ensure sufficient creep strength by forming the low temperature rotor member from 2.25CrMoV steel of which the creep strength is higher than 1% Cr steel. Additionally, a suitable turbine rotor is obtained without occurrence of delayed cracks in the high temperature rotor by performing welding using a 9% Cr-based filler material of which the nitrogen content is 0.025% or lower by mass %, and performing heat treatment for 40 to 60 hours at 625 to 650° C. so that the Vickers hardness of the high temperature rotor member is set to HV 350 or less.

Additionally, the low temperature rotor member may be formed from 3.5NiCrMoV steel, and the high temperature rotor member and the low temperature rotor member which are welded together may be subjected to heat treatment for 40 to 60 hours at 595 to 620° C. so that the Vickers hardness of the high temperature rotor member is set to HV 350 or less.

Moreover, the obtained turbine rotor is capable of ensuring suitable strength without the occurrence of delayed cracks in the rotor for high temperature by forming the low temperature rotor member from 3.5NiCrMoV steel, performing welding using a 9% Cr-based filler material of which the nitrogen content is 0.025% or lower by mass %, and performing heat treatment for 40 to 60 hours at 595 to 620° C. so that the Vickers hardness of the high temperature rotor member is set to HV 350 or less.

Moreover, the invention of a manufacturing method of a turbine rotor for solving the problems is a manufacturing method of a turbine rotor joined by welding a high temperature rotor member made of high Cr steel, and a low temperature rotor member made of low Cr steel. The high temperature rotor member is formed from high Cr steel of which the nitrogen content is 0.02% or higher by mass %, and the high temperature rotor member and the low temperature rotor member are joined together by welding with a 9% Cr-based filler material of which the nitrogen content is 0.025% or lower by mass %.

The low temperature rotor member may be formed from 2.25CrMoV steel, and after the high temperature rotor member and the low temperature rotor member are joined together by welding, the high temperature rotor member and the low temperature rotor member which are welded together may be subjected to heat treatment for 40 to 60 hours at 625 to 650° C. are joined together by welding so that the Vickers hardness of the high temperature rotor member is set to HV 350 or less.

The low temperature rotor member may be formed from 3.5NiCrMoV steel, and after the high temperature rotor member and the low temperature rotor member are joined together by welding, the high temperature rotor member and the low temperature rotor member which are welded together may be subjected to heat treatment for 40 to 60 hours at 595 to 620° C. are joined together by welding so that the Vickers hardness of the high temperature rotor member is set to HV 350 or less.

As described above, according to the invention, it is possible to provide a turbine rotor having suitable strength and toughness without causing soaring manufacturing costs and prolonged manufacturing time, and a manufacturing method of the turbine rotor.

DETAILED DESCRIPTION OF THE PREFERRED EMBODIMENT (Selection of Filler Material)

The present inventor has studied in detail the cause of generation of minute blowholes generated in a conventional welded joint between dissimilar kinds of steels. Although carbon monoxide has conventionally been considered to be often the cause of the generation of blowholes in a welded portion, as a result of analyzing the gas inside the blowholes it was proven that the gas inside the minute blowholes is nitrogen gas.

Figure 4:
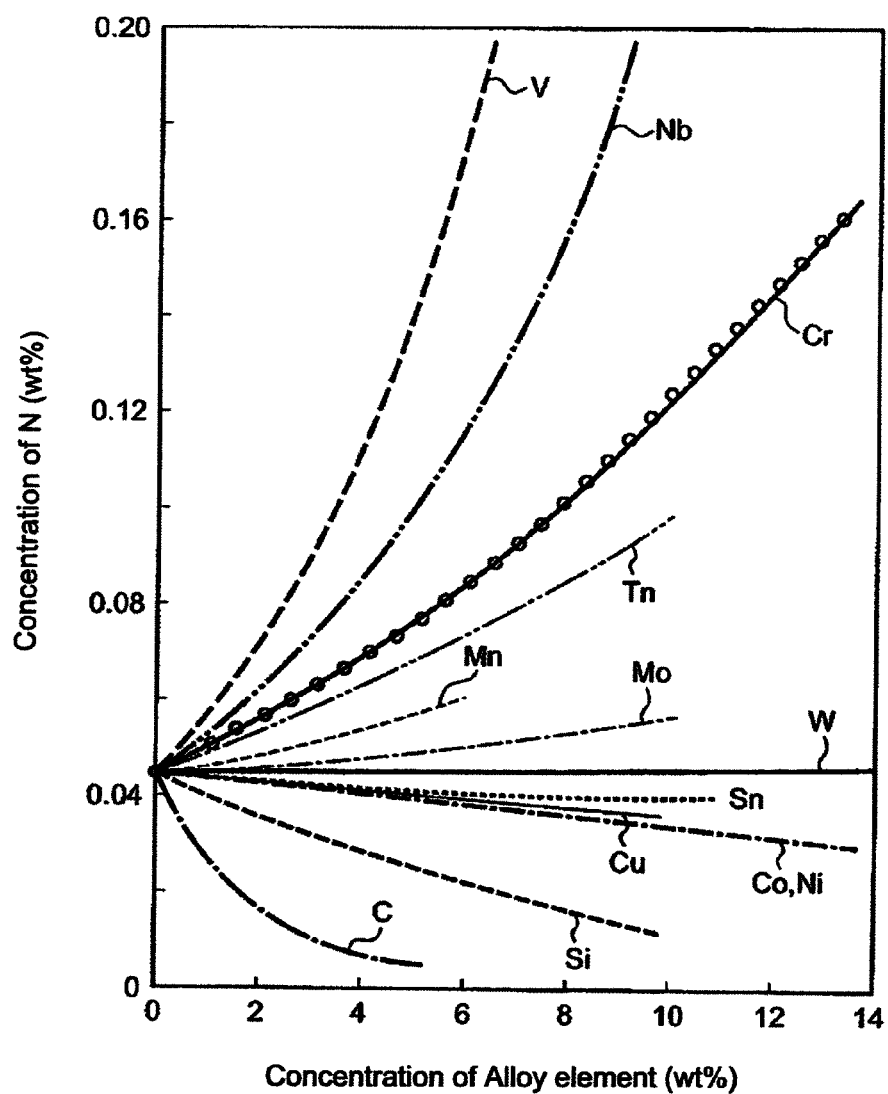
FIG. 4 is a graph showing the influence of alloy elements exerted on the solubility of N in molten iron at 1600° C.

FIG. 4 is a graph showing the influence of alloy elements exerted on the solubility of N in molten iron at 1600° C. (Steel and Iron Handbook (Third Edition, First Volume Foundation, 1981, and Page 417) Published by Iron and Steel Institute of Japan). The abscissa axis represents the concentration (wt %) of alloy elements contained in molten iron, and the ordinate axis represents the solubility (wt %) of N. It can be seen from FIG. 4 that the solubility of N is higher as the content of Cr in molten iron is greater.

When a welded joint between high Cr steel strengthened with 0.02% of nitrogen by mass % and low alloy steel is not subjected to build-up welding, but is subjected to welding with a Cr steel filler material, the nitrogen contained for the strengthening on the side of the high Cr steel melts into the filler material. However, the solubility of the nitrogen in the filler material depends on the content of Cr as shown in FIG. 4. Therefore, when low Cr steel is used for a filler material, since the content of Cr in the filler material is low, the solubility of nitrogen is small, the nitrogen in excess of the solubility becomes gas, and the nitrogen gas which was not able to dissipate from the molten pool during welding becomes blowholes.

Hence, it is necessary to use a filler material with high Cr content, and it was decided that a 9% Cr-based filler material which has Cr content close to the high Cr steel is to be used as the filler material.

However, minute blowholes may be generated even in the use of 9% Cr-based filler material. It is believed that this is because a small amount of nitrogen is often contained in the 9% Cr-based filler material which is generally available. This nitrogen and the nitrogen included in the high Cr steel melt into welded metal, and if the amount of the nitrogen is large, minute blowholes are generated.

Thus, seven kinds of 9% Cr-based filler materials (samples 1 to 7) which are different in nitrogen content, and are almost the same in the content of other components were manufactured by way of trial, welding of a welded joint made of high Cr steel and 2.25CrMoV steel was performed, and the situation of generation of minute blowholes within welded metal was investigated by ultrasonic inspection. The results are summarized in Table 1. In Table 1, numeric values represent the content (mass %) of respective components in samples. As is clear from Table 1, minute blowholes were not generated when the nitrogen content in the filler material was 0.025% or lower by mass %. Accordingly, when a 9% Cr-based filler material in which the nitrogen content is 0.025% or lower by mass % was used, it was confirmed that the generation of blowholes could be prevented.

TABLE 1

| | Chemical Component (Mass %) | | | | | | | | | | | | | Existence of Minute |
|---|---|---|---|---|---|---|---|---|---|---|---|---|---|---|
| | C | Si | Mn | P | S | Ni | Cr | Mo | Cu | V | Nb | N | Fe | Blowhole |
| 1 | 0.08 | 0.15 | 1.01 | 0.007 | 0.005 | 0.81 | 8.97 | 0.90 | 0.18 | 0.16 | 0.04 | <0.001 | Bal. | No |
| 2 | 0.09 | 0.16 | 1.00 | 0.006 | 0.006 | 0.80 | 8.71 | 0.81 | 0.15 | 0.18 | 0.03 | 0.011 | Bal. | No |
| 3 | 0.08 | 0.16 | 0.99 | 0.008 | 0.007 | 0.70 | 8.94 | 0.89 | 0.17 | 0.17 | 0.04 | 0.025 | Bal. | No |
| 4 | 0.09 | 0.17 | 0.98 | 0.008 | 0.006 | 0.77 | 8.87 | 0.87 | 0.19 | 0.17 | 0.03 | 0.048 | Bal. | Yes |
| 5 | 0.08 | 0.16 | 0.96 | 0.007 | 0.006 | 0.72 | 8.96 | 0.83 | 0.15 | 0.16 | 0.03 | 0.062 | Bal. | Yes |
| 6 | 0.08 | 0.16 | 1.07 | 0.006 | 0.005 | 0.68 | 8.76 | 0.88 | 0.16 | 0.18 | 0.04 | 0.087 | Bal. | Yes |
| 7 | 0.09 | 0.17 | 0.92 | 0.008 | 0.007 | 0.81 | 8.97 | 0.79 | 0.20 | 0.19 | 0.02 | 0.095 | Bal. | Yes |

Examples

Preferred examples of the invention will be illustratively described below in detail with reference to the drawings. Here, the dimensions, materials, shapes, relative arrangements, etc. of component parts described in this example are not meant to limit the scope of the invention, but are merely simple explanatory examples, as long as there is no specific description of limitations.

(Manufacture of Turbine Rotor)

Figure 1:
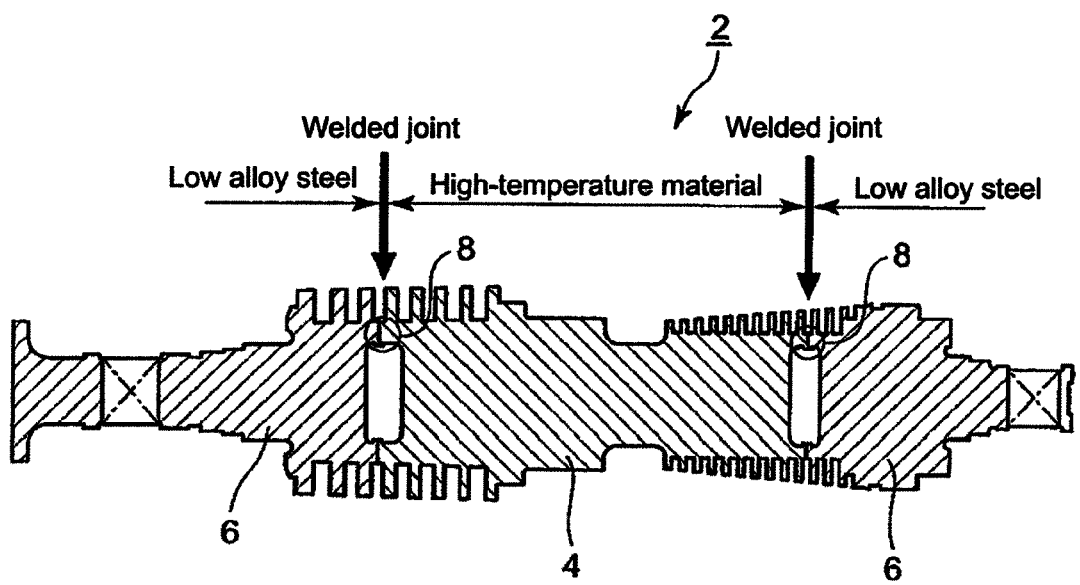
FIG. 1 is a sectional view of a turbine rotor manufactured according to the invention.
Figure 2:
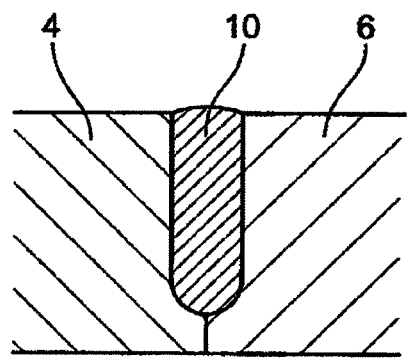
FIG. 2 is an enlarged view near a welded portion in FIG. 1.

FIG. 1 is a sectional view of a turbine rotor manufactured according to the invention, and FIG. 2 is an enlarged view in the vicinity of a welded portion 8 in FIG. 1. As shown in FIG. 1, a high temperature rotor member 4 made of 10% Cr steel or a 10% Cr steel material containing W, which is high Cr steel, and a low temperature rotor member 6 made of 2.25% CrMoV steel or 3.5NiCrMoV steel that is low Cr steel are butted against each other, and are subjected to, for example, arc-welding by using the 9% Cr-based filler material in which the nitrogen content is 0.025% or lower by mass %, thereby forming a welded portion 10 between the high temperature rotor member 4 and the low temperature rotor member 6.

The 10% Cr steel or 10% Cr steel material containing W, which is used for the high temperature rotor member 4, the 2.25% CrMoV steel or 3.5NiCrMoV steel used for the low temperature rotor member 6, and the 9% Cr-based filler material include, for example, composition ranges shown in Table 2. In this example, materials of compositions of the example similarly shown in Table 2 were used as the above materials.

TABLE 2

| | | | Chemical Composition (Mass %) | | | | | | | | | | |
|---|---|---|---|---|---|---|---|---|---|---|---|---|---|
| | | | C | Si | Mn | Ni | Cr | Mo | V | N | Nb | W | Fe |
| High Cr Steel | 10% Cr Steel | Composition Range | 0.05 to 0.4 | ≤0.35 | ≤2 | ≤7.0 | 8 to 15 | 0.1 to 3 | 0.01 to 0.5 | 0.02 to 0.1 | ≤0.02 | — | Bal. |
| | | Example | 0.14 | 0.03 | 0.20 | 1.07 | 9.73 | 1.39 | 0.20 | 0.041 | 0.04 | — | Bal. |
| | 10% Cr Steel Containing W | Composition Range | 0.05 to 0.4 | ≤0.35 | ≤2 | ≤7.0 | 8 to 15 | ≤1 | 0.01 to 0.5 | 0.02 to 0.1 | ≤0.2 | 0.1 to 3 | Bal. |
| | | Example | 0.12 | 0.06 | 0.58 | 0.05 | 10.20 | 0.65 | 0.20 | 0.05 | 0.05 | 1.63 | Bal. |
| Low Cr Steel | 2.25% CrMoV Steel | Composition Range | 0.2 to 0.35 | ≤0.35 | ≤1.5 | 0.2 to 2.0 | 1.5 to 3.0 | 0.90 to 1.50 | 0.20 to 0.30 | — | — | — | Bal. |
| | | Example | 0.25 | 0.03 | 0.76 | 0.83 | 2.26 | 1.12 | 0.23 | — | — | — | Bal. |
| | 3.5% NiCrMoV Steel | Composition Range | ≤0.40 | ≤0.35 | ≤1.0 | 3.0 to 4.5 | 1.0 to 2.5 | 0.1 to 1.5 | 0.01 to 0.3 | — | — | — | Bal. |
| | | Example | 0.25 | 0.03 | 0.40 | 3.59 | 1.80 | 0.38 | 0.13 | — | — | — | Bal. |
| Filler Material | 9% Cr-Based | Composition Range | ≤0.10 | ≤0.30 | ≤1.20 | ≤1.0 | 8.00 to 9.50 | 0.60 to 1.00 | 0.10 to 0.30 | ≤0.025 | ≤0.04 | — | Bal. |
| | | Filler Material Example | 0.08 | 0.16 | 0.99 | 0.7 | 8.94 | 0.89 | 0.17 | 0.023 | 0.04 | — | Bal. |

In a case where the low temperature rotor member 6 is 2.25CrMoV steel, the Vickers hardness of the high temperature rotor member is set to HV 350 or less by carrying out heat treatment for 40 to 60 hours within a temperature range of 625 to 650° C. Especially, in a case where the high temperature rotor member is 10% Cr steel, or 10% Cr steel containing W, in order to set HV hardness to 350 or less, it is preferable to hold heat-treatment time for a long time, and it is particularly preferable to set the heat-treatment time to 60 hours.

Figure 8:
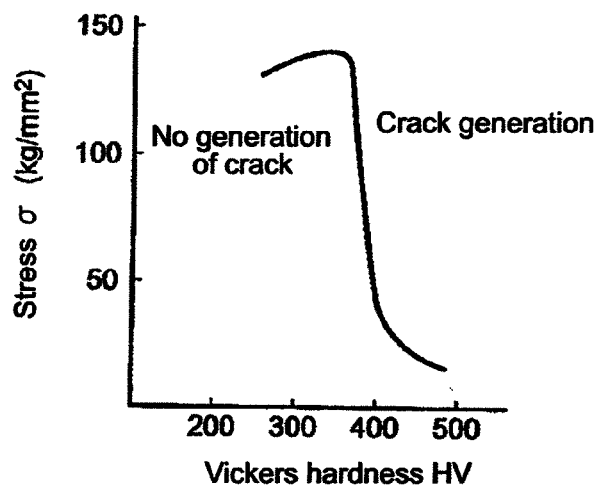
FIG. 8 is a graph showing Vickers hardness, and a delayed crack occurrence region.

FIG. 8 is a graph showing Vickers hardness, and a delayed crack occurrence region (Turbomachinery Society of Japan, 53rd Seminar Data (2001) "Corrosion and Erosion of Steam Turbine", Hitomi Ito). As is clear from FIG. 8, if the Vickers hardness HV is 350 or less, a delayed crack does not occur even if the stress applied to a high temperature rotor member is high, and if the Vickers hardness HV exceeds 350, a delayed crack occurs even if the stress is low. Accordingly, a turbine rotor which does not cause delayed cracks can be manufactured by carrying out heat treatment within a temperature range of 625 to 650° C. for 40 to 60 hours, and setting the Vickers hardness HV to 350 or less.

Additionally, in a case where the low temperature rotor member 6 is 3.5NiCrMoV steel, the Vickers hardness of the high temperature rotor member can be set to HV 350 or less by carrying out heat treatment for 40 to 60 hours within a temperature range of 595 to 620° C.

(Evaluation)

Figure 3:
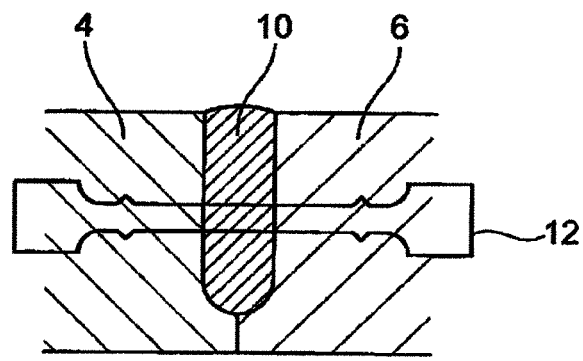
FIG. 3 is a sectional view showing a joint in an example.

As shown in FIG. 3, after the high temperature rotor member 4 and the low temperature rotor member 6 with the compositions of the example shown in Table 2 were grooved by cutting, respectively, the welded portion 10 was formed between these members 4 and 6 by using the 9% Cr-based filler material shown in Table 1. Subsequently, a welded joint was manufactured by heat-treating the rotor member 4 and 6 formed by the welded portion 10 was heat-treated for the aforementioned period of time at the aforementioned temperature.

As shown in FIG. 3, a specimen 12 was sampled from a spot with ½ of the thickness of the welded joint, and a creep test was carried out under a constant test temperature. The creep test was conducted after the following two kinds of welded joints were manufactured.

Specimen 1: high temperature rotor member: 10% Cr steel and low temperature rotor member: 2.25% CrMoV steel Specimen 2: high temperature rotor member: 10% Cr steel containing W and low temperature rotor member: 2.25% CrMoV steel Additionally, as a comparative example, Specimen 3 (high temperature rotor member: 10% Cr steel and low temperature rotor member: 1% CrMoV steel) was prepared, and a creep test was also conducted on this specimen under a constant test temperature.

Figure 5:
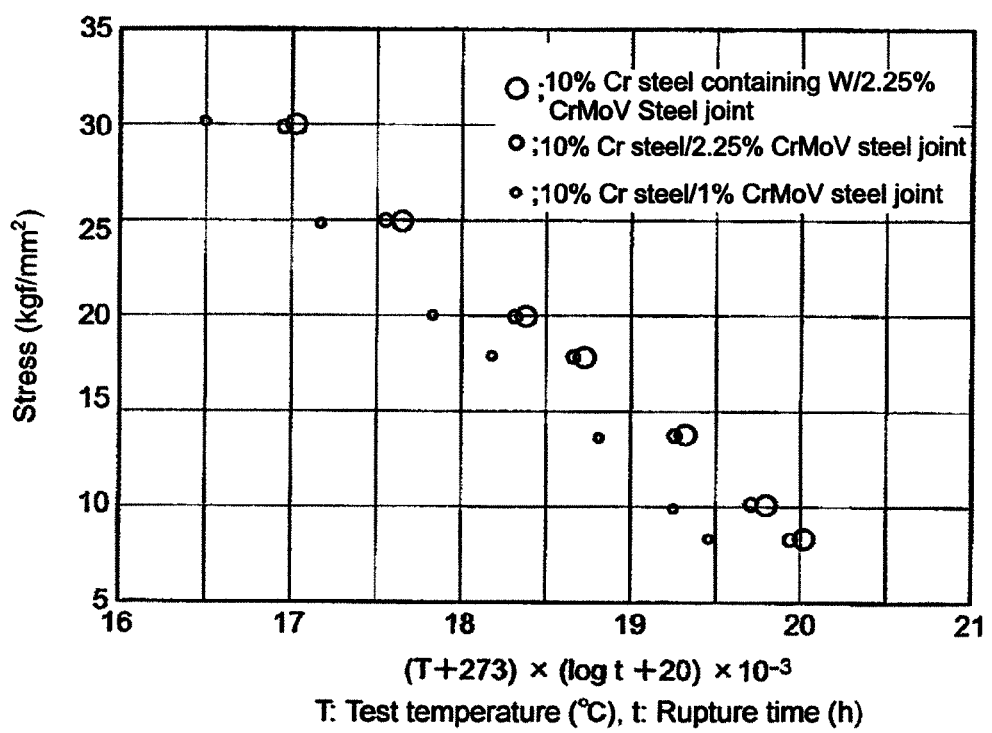
FIG. 5 is a diagram showing the creep rupture test result of a welded joint.

The results are shown in FIG. 5. In FIG. 5, the ordinate axis represents stress, and the abscissa axis represents values which are determined according to creep-test temperature and rupture time. Since a creep test is conducted under a constant test temperature, indexes of the rupture time are shown in FIG. 5. As shown in FIG. 5, in this example, it was confirmed that the improvement in creep strength was accomplished more than the comparative example using 1% CrMoV steel for the low temperature rotor member.

Figure 6:
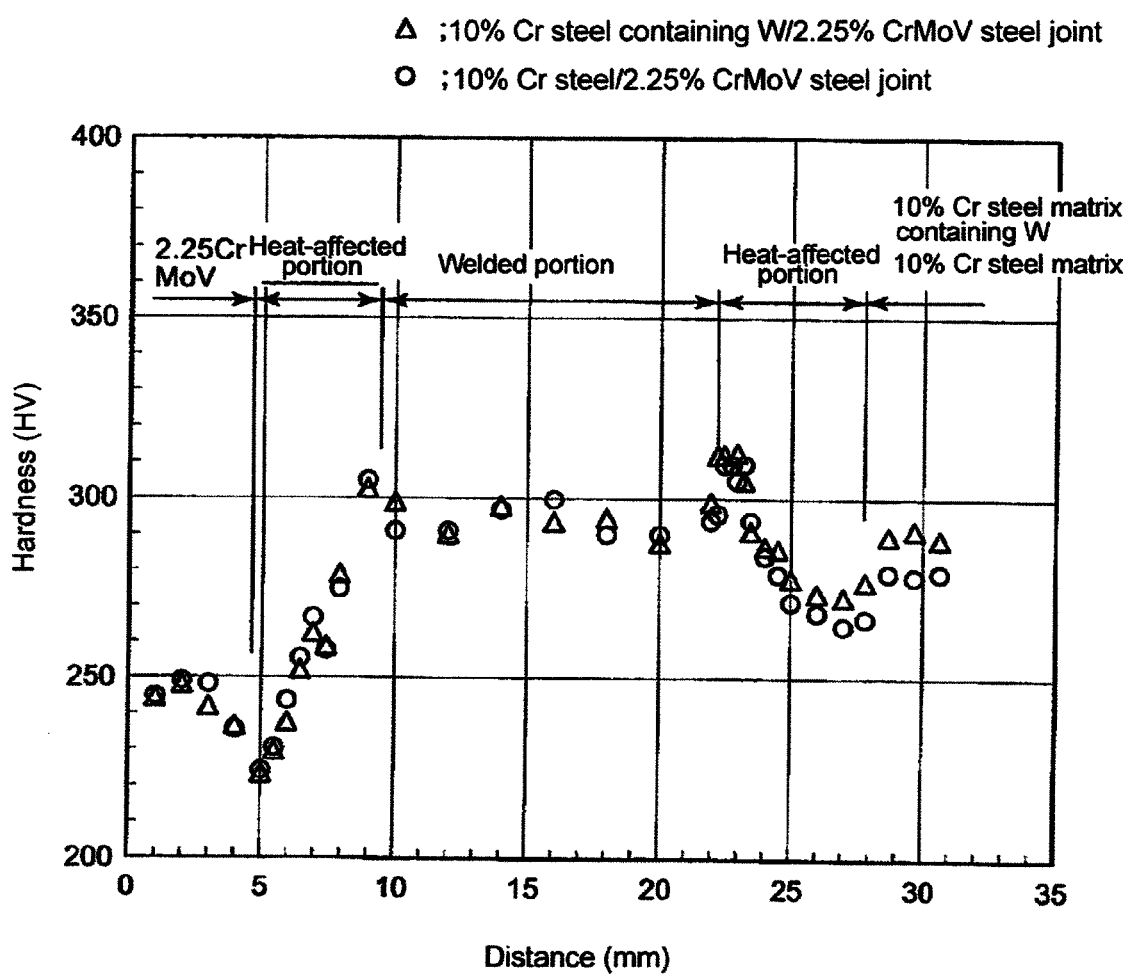
FIG. 6 is a diagram showing hardness in measurement points including the welded joint in the example.

Furthermore, the hardness distribution of Specimens 1 and 2 was measured. The results are shown in FIG. 6. In FIG. 6, the ordinate axis represents the Vickers hardness HV, and the abscissa axis represents the distance from a fixed point of the low temperature rotor member 6. As is clear from FIG. 6, it was confirmed that the obtained welded joint show HV 350 or less in any of the 10% Cr steel or 10% Cr steel containing W, a heat-affected zone, a welded portion, 2.25% CrMoV steel, and a heat-affected zone.

Moreover, the hardness distribution of the following specimen 4 was also measured similarly to Specimens 1 and 2.

Figure 7:
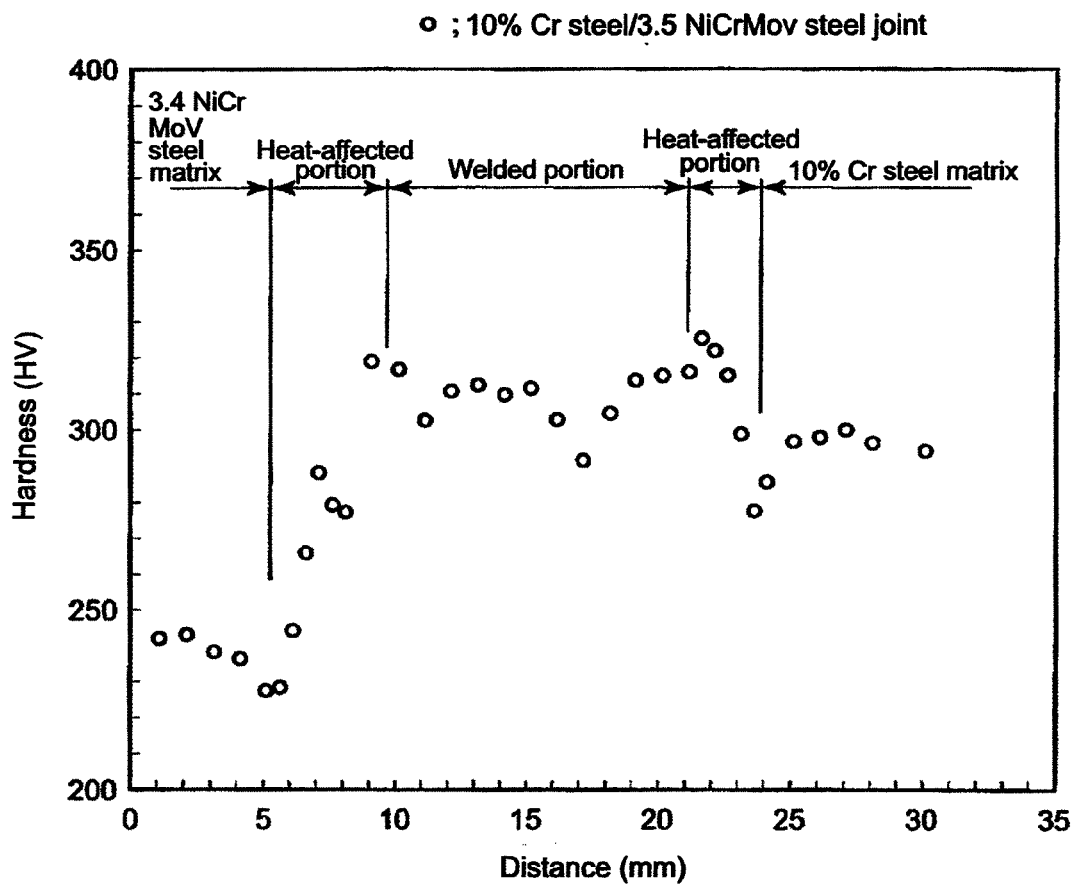
FIG. 7 is a diagram showing hardness in measurement points including another welded joint in the example.

Specimen 4: high temperature rotor member: 10% Cr steel and low temperature rotor member: 3.5% NiCrMoV steel The results are shown in FIG. 7. It was confirmed that Specimen 4 showed HV 350 or less in any arbitrary points, similarly to Specimens 1 and 2.

Additionally, the 0.2% proof stress and tensile strength of Specimens 1, 2, and 4 were measured. The results are shown in Table 3. Moreover, the impact properties (absorbed energy and 50% fracture appearance transition temperature at room temperature) of a heat-affected zone and welded portion of the specimen was investigated. The results are shown in Table 4. In addition, specification values in Tables 3 and 4 indicate ranges which need to be satisfied in order for a manufactured turbine rotor to be used without problems.

TABLE 3

| Target Welded Joint | | | | 0.2% Proof Stress (N/mm$^2$) | Tensile Strength (N/mm$^2$) |
|---|---|---|---|---|---|
| 10% Cr Steel + 2.25% CrMoV Steel Welded Joint (Specimen 1) | Matrix | 10% Cr Steel | Specification Value | ≥686 | ≥830 |
| | | | Measured Value | 750 | 880 |
| | | 2.25CrMoV Steel | Specification Value | ≥588 | ≥725 |
| | | | Measured Value | 620 | 780 |
| | Welded Joint | 10% Cr Steel + 2.25CrMoV | Specification Value | ≥588 | ≥725 |
| | | | Measured Value | 650 | 775 |
| 10% Cr Steel Containing W + 2.25% CrMoV Steel Welded Joint (Specimen 2) | Matrix | 10% Cr Steel Containing W | Specification Value | ≥667 | ≥830 |
| | | | Measured Value | 760 | 892 |
| | | 2.25CrMoV Steel | Specification Value | ≥588 | ≥725 |
| | | | Measured Value | 675 | 792 |
| | Welded Joint | 10% Cr Steel Containing W + 2.25CrMoV | Specification Value | ≥588 | ≥725 |
| | | | Measured Value | 653 | 788 |
| 10% Cr Steel + 3.5% NiCrMoV Steel Welded Joint (Specimen 4) | Matrix | 10% Cr Steel | Specification Value | ≥686 | ≥830 |
| | | | Measured Value | 745 | 874 |
| | | 3.5NiCrMoV Steel | Specification Value | ≥621 | ≥725 |
| | | | Measured Value | 710 | 820 |
| | Welded Joint | 10% Cr Steel + 3.5NiCrMoV | Specification Value | ≥621 | ≥725 |
| | | | Measured Value | 709 | 792 |

TABLE 4

| Target Welded Joint | | | | Absorption Energy at Room Temperature (J) | 50% Fraction Transition Temperature (° C.) |
|---|---|---|---|---|---|
| 10% Cr Steel + 2.25% CrMoV Steel Welded Joint (Specimen 1) | Matrix | 10% Cr Steel | Specification Value | ≥20 | ≤60 |
| | | | Measured Value of matrix | 80 | 20 |
| | | | Measured Value of Heat-Affected zone | 200 | −45 |
| | | 2.25CrMoV Steel | Specification Value | ≥8 | ≤100 |
| | | | Measured Value of matrix | 45 | 5 |
| | | | Measured Value of Heat-Affected zone | 150 | −35 |
| | Welded Joint | 9% Cr-based | Specification Value | ≥8 | ≥≤100 |
| | | | Measured Value | 170 | 3 |
| 10% Cr Steel Containing W + 2.25% CrMoV Steel Welded | Matrix | 10% Cr Steel Containing W | Specification Value | ≥20 | ≤80 |
| | | | Measured Value of matrix | 120 | 10 |

TABLE 4-continued

| Target Welded Joint | | | | Absorption Energy at Room Temperature (J) | 50% Fraction Transition Temperature (°C) |
|---|---|---|---|---|---|
| Joint (Specimen 2) | | | Measured Value of Heat-Affected zone | 200 | −40 |
| | | 2.25CrMoV Steel | Specification Value | ≥8 | ≤100 |
| | | | Measured Value of matrix | 50 | 10 |
| | | | Measured Value of Heat-Affected zone | 153 | −35 |
| | Welded Joint | 9% Cr-based | Specification Value | ≥8 | ≤100 |
| | | | Measured Value | 163 | 5 |
| 10% Cr Steel + 3.5% NiCrMoV Steel Welded Joint (Specimen 4) | Matrix | 10% Cr Steel | Specification Value | ≥20 | ≤60 |
| | | | Measured Value of matrix | 90 | 10 |
| | | | Measured Value of Heat-Affected zone | 195 | −30 |
| | | 3.5NiCrMoV Steel | Specification Value | ≥68 | ≤−7 |
| | | | Measured Value of matrix | 240 | −95 |
| | | | Measured Value of Heat-Affected zone | 200 | −100 |
| | Welded Joint | 9% Cr-based | Specification Value | ≥68 | ≤−7 |
| | | | Measured Value | 185 | −55 |

It can be seen from Table 3 that the actual measurements of the 0.2% proof stress and tensile strength of a welded joint obtained and its constituent matrix satisfy all the specification values, and satisfy the strength level required for a rotor. Additionally, as is clear from Table 4, it can be seen that the matrix, welded portion, etc. of the welded joint obtained have impact properties which sufficiently satisfy specification values.

From the foregoing, it can be said that the turbine rotor and manufacturing method obtained according to the invention has suitable strength and toughness, without causing soaring manufacturing costs and prolonged manufacturing time since welding and heat treatment are performed at a time.

The invention claimed is:

1. A turbine rotor formed by welding a rotor member made of high Cr steel and a rotor member made of low Cr steel, comprising:
   the rotor member made of high Cr steel containing 0.02% to 0.1% of nitrogen by mass % to reinforce strength and having a chemical composition (1) or (2), where
   (1) contains, by mass %, C: 0.05 to 0.4, Si: 0.35 or less, Mn: 2 or less, Ni: 7.0 or less, Cr: 8 to 15, Mo: 0.1 to 3, V: 0.01 to 0.5, N: 0.02 to 0.1, Nb: 0.2 or less, and balance Fe, and
   (2) contains, by mass %, C: 0.05 to 0.4, Si: 0.35 or less, Mn: 2 or less, Ni: 7.0 or less, Cr: 8 to 15, Mo: 1 or less, V: 0.01 to 0.5, N: 0.02 to 0.1, Nb: 0.2 or less, W: 0.1 to 3, and balance Fe;
   the rotor member made of low Cr steel having a chemical composition (3) or (4), where
   (3) contains, by mass %, C: 0.2 to 0.35, Si: 0.35 or less, Mn: 1.5 or less, Ni: 0.2 to 2.0, Cr: 1.5 to 3.0, Mo: 0.9 to 1.50, V: 0.2 to 0.30, and balance Fe, and
   (4) contains, by mass %, C: 0.4 or less, Si: 0.35 or less, Mn: 1.20 or less, Ni: 3.0 to 4.5, Cr: 1.5 to 2.5, Mo: 0.1 to 1.50, V: 0.01 to 0.3, and balance Fe; and
   a weld that connects the rotor member made of high Cr steel and the rotor member made of low Cr steel together, the weld comprising a filler material that has a chemical composition (5), where
   (5) contains, by mass %, C: 0.10 or less, Si: 0.30 or less, Mn: 1.20 or less, Ni: 1.0 or less, Cr: 8.00 to 9.50, Mo: 0.60 to 1.00, V: 0.10 to 0.30, N: 0.001 to 0.025, Nb: 0.04 or less, and balance Fe.

2. The turbine rotor of claim 1, wherein:
   the rotor member made of low Cr steel is formed from 2.25CrMoV steel having the chemical composition (3); and
   the rotor member made of high Cr steel has a Vickers hardness of HV 350 or less that has been set by heat treatment of the rotor member made of high Cr steel and the rotor member made of low Cr steel, welded together, for 40 to 60 hours at 625 to 650 degrees C.

3. The turbine rotor of claim 1, wherein:
   the rotor member made of low Cr steel is formed from 3.5NiCrMoV steel having said chemical composition (4); and
   the rotor member made of high Cr steel has a Vickers hardness of HV 350 or less that has been set by heat treatment of the rotor member made of high Cr steel and the rotor member made of low Cr steel, welded together, for 40 to 60 hours at 595 to 620 degrees C.

4. The turbine rotor of claim 1, wherein the nitrogen content of the rotor member made of high Cr steel is 0.041% by mass.

5. The turbine rotor of claim 4, wherein the nitrogen content of the chemical composition of the filler material of the weld is 0.023 by mass %.

6. The turbine rotor of claim 1, wherein the nitrogen content of the rotor member made of high Cr steel is 0.05% by mass.

7. The turbine rotor of claim 6, wherein the nitrogen content of the chemical composition of the filler material of the weld is 0.023 by mass %.

8. The turbine rotor of claim 1, wherein the nitrogen content of the chemical composition of the filler material of the weld is 0.011 to 0.025 by mass %.

9. A manufacturing method of the turbine rotor according to claim 7 formed by welding a rotor member made of high Cr steel, and a rotor member made of low Cr steel,
wherein the rotor member made of high Cr steel is formed from 10Cr steel having the following chemical composition (1) or 10Cr steel containing W having the following chemical composition (2), of which the nitrogen content is 0.02% or higher by mass %, and
wherein a filler material which welds the rotor member made of high Cr steel, and the rotor member made of low Cr steel having the following chemical compositions (3) and (4) together is a 9% Cr-based filler material having the following chemical composition (5), of which the nitrogen content is 0.025% or lower by mass %,
Chemical composition (1) containing, by mass %, C: 0.05 to 0.4, Si: 0.35 or less, Mn: 2 or less, Ni: 7.0 or less, Cr: 8 to 15, Mo: 0.1 to 3, V: 0.01 to 0.5, N: 0.02 to 0.1, Nb: 0.2 or less, and balance Fe;
Chemical composition (2) containing, by mass %, C: 0.05 to 0.4, Si: 0.35 or less, Mn: 2 or less, Ni: 7.0 or less, Cr: 8 to 15, Mo: 1 or less, V: 0.01 to 0.5, N: 0.02 to 0.1, Nb: 0.2 or less, W: 0.1 to 3, and balance Fe;
Chemical composition (3) containing, by mass %, C: 0.2 to 0.35, Si: 0.35 or less, Mn: 1.5 or less, Ni: 0.2 to 2.0, Cr: 1.5 to 3.0, Mo: 0.90 to 1.50, V: 0.20 to 0.30, and balance Fe;
Chemical composition (4) containing, by mass %, C: 0.40 or less, Si: 0.35 or less, Mn: 1.20 or less, Ni: 3.0 to 4.5, Cr: 1.5 to 2.5, Mo: 0.1 to 1.5, V: 0.01 to 0.3, and balance Fe; and
Chemical composition (5) containing, by mass %, C: 0.10 or less, Si: 0.30 or less, Mn: 1.20 or less, Ni: 1.0 or less, Cr: 8.00 to 9.50, Mo: 0.60 to 1.00, V: 0.10 to 0.30, N: 0.001 to 0.025, Nb: 0.04 or less, and balance Fe.

10. The manufacturing method of a turbine rotor according to claim 9,
wherein the rotor member made of low Cr steel is formed from 2.25CrMoV steel having the above chemical composition (3), and
after the rotor member made of high Cr steel and the rotor member made of low Cr steel are joined together by welding, the rotor member made of high Cr steel and the rotor member made of low Cr steel which are welded together are subjected to heat treatment for 40 to 60 hours at 625 to 650° C. so that the Vickers hardness of the rotor member made of high Cr steel is set to HV 350 or less.

11. The manufacturing method of a turbine rotor according to claim 9,
wherein the rotor member made of low Cr steel is formed from 3.5NiCrMoV steel having the above chemical composition (4), and
after the rotor member made of high Cr steel and the rotor member made of low Cr steel are joined together by welding,
the rotor member made of high Cr steel and the rotor member made of low Cr steel which are welded together are subjected to heat treatment for 40 to 60 hours at 595 to 620° C. so that the Vickers hardness of the rotor member made of high Cr steel is set to HV 350 or less.

12. A turbine rotor formed by welding a rotor member made of high Cr steel and a rotor member made of low Cr steel, comprising;
the rotor member made of high Cr steel containing 0.02% to 0.1% of nitrogen by mass % to reinforce strength and having a chemical composition (1) or (2), where
(1) contains, by mass %, C: 0.05 to 0.4, Si: 0.35 or less, Mn: 2 or less, Ni: 7.0 or less, Cr: 8 to 15, Mo: 0.1 to 3, V: 0.01 to 0.5, N: 0.002 to 0.1, Nb: 0.2 or less, and balance Fe, and
(2) contains, by mass %, C: 0.05 to 0.4, Si: 0.35 or less, Mn: 2 or less, Ni: 7.0 or less, Cr: 8 to 15, Mo: 1 or less, V: 0.01 to 0.5, N: 0.002 to 0.1, Nb: 0.2 or less, W: 0.1 to 3, and balance Fe;
the rotor member made of low Cr steel having a chemical composition (3) or (4), where
(3) contains, by mass % C: 0.2 to 0.35, Si: 0.35 or less, Mn: 1.5 or less, Ni: 0.2 to 2.0, Cr: 1.5 to 3.0, Mo: 0.9 to 1.50, V: 0.2 to 0.30, and balance Fe, and
(4) contains, by mass % C: 0.4 or less, Si: 0.35 or less, Mn: 1.20 or less, Ni: 3.0 to 4.5, Cr: 1.5 to 2.5, Mo: 0.1 to 1.50, V: 0.01 to 0.3, and balance Fe; and
a weld that connects the rotor member made of high Cr steel and the rotor member made of low Cr steel together, the weld comprising a filler material that has a chemical composition (5), where
(5) contains, by mass % C: 0.10 or less, Si: 0.30 or less, Mn: 1.20 or less, Ni: 1.0 or less, Cr: 8.00 to 9.50, Mo: 0.60 to 1.00, V: 0.10 to 0.30, N: 0.023, Nb: 0.04 or less, and balance Fe.

* * * * *